United States Patent Office 2,721,803
Patented Oct. 25, 1955

2,721,803

METHOD OF BLENDING OILS AND THE RESULTING PRODUCT

Wells W. Ginn, Cincinnati, Ohio, assignor to Vejin, Inc., Cincinnati, Ohio, a corporation of Ohio No Drawing. Application December 30, 1952, Serial No. 328,827

7 Claims. (Cl. 99—118)

This invention relates to a method of combining fats and oils which are constituted primarily by triglycerides of the higher fatty acids but which do not have the inherent compatibility to stay in intersolution at temperatures within the range in which the products are to be used. More specifically, if a relatively hard fat, such as wholly or substantially hydrogenated cotton seed, soy bean, corn oil, lard, or tallow is mixed with a relatively soft or liquid fat, such as olive oil or the unhydrogenated corn, cotton seed and soy oils or lard oil, then some degree of separation of the comparatively solid and liquid components is apt to take place particularly if the mixture is subjected to any sort of chilling. I have discovered that the compatibility of fatty materials of the type described is substantially improved by the addition of a minor percentage of rape-seed oil and/or rice oil such as, say, 5 to 25 per cent.

In general, the triglycerides to which this invention is applicable may be of animal, vegetable, or synthetic origin, and the invention is applicable under any circumstances and conditions wherein relatively solid and relatively liquid triglycerides are mixed, and compatibility of the two components, i. e. their intersolubility, is less than desired.

While the problem of combining hydrogenated and unhydrogenated triglycerides may arise in many fields, I prefer to exemplify the use of my invention in relation to the problems of providing oils which are suitable for greasing the pans which are used in commercial bakeries in the production of bread, cakes, and the many other items which the commercial bakery makes from different doughs and batters. In every instance the objective of greasing the pan is to prevent the dough or batter from adhering to the pan, and in every instance it is desirable to prevent this undesirable effect with minimum expenditure of pan greasing material. Further, it is desirable that the material used for greasing the pan adhere to the vertical walls of such pan even at relatively elevated temperatures so that the grease does not run down to the bottom of the pan causing pools at the bottom to make a "soggy" cake and also permitting the pastry to stick to the pan's denuded sides.

I have determined that the best grease for preventing dough or batter being baked from sticking to the baking pans or utensils is a variable percentage of a substantially completely hydrogenated triglyceride of the higher fatty acids, for instance, fully, or substantially fully, hardened vegetable oil such as soya, corn or cottonseed oils. These fully hardened triglyceride particles tend to cling to the walls of the pan to reinforce the thin film of the vehicle of lighter viscosity, and, together, they prevent running and sticking even at the elevated temperatures used in baking.

These completely hydrogenated fats would be effective if used alone; however, it is practically impossible to apply thin films of such high melting point fats to the pans or to handle such materials in a bakery. To facilitate application of such hardened fats they must be blended with more liquid fats, such as ordinary soya, corn and cottonseed oils. The necessary blending, however, is not easy because the hardened fat does not dissolve in the unhardened oil and tends to separate out somewhat at all temperatures, but more so as the oil is chilled. Consequently, it is difficult to maintain a homogeneous solution during shipment and storage, and at variable temperatures thus encountered. I accomplished the necessary blending by incorporating rape-seed oil and/or rice oil in the mixture. Typical formulae are as follows:

For bread:
    85% refined and deodorized soy oil
    5% refined rice oil
    10% completely hydrogenated soy oil
        Titre—135° F. to 165° F.

For bread:
    70% refined and deodorized soy oil
    10% refined rape-seed oil
    20% completely hydrogenated soy oil
        Titre—130° F. to 140° F.

For cakes:
    56% refined and deodorized soy oil
    5.6% refined rice oil
    7.4% completely hydrogenated soy oil
        Titre 135° F. to 165° F.
    31% partially gelatinized flour and protein mixture These blended oils are applied to baking pans or utensils in any conventional manner, such as by spraying, and a very thin film is effective to prevent sticking. If fully hardened fats are used, then the amount of hard fat should not exceed 12 to 15 per cent, but if solid fats of lower titre are used, the amount may be increased to substantially 25 or 30 per cent.

Having described my invention, I claim:

1. The method of combining at least two fatty triglycerides which are not mutually soluble and consequently do not fully dissolve together, one of said triglycerides having relatively high titre and relatively low iodine value, the other having relatively low titre and relatively high iodine value, said method comprising intermixing said fatty triglycerides in the presence of substantially 5 to 25 per cent of a member of the class consisting of rape-seed oil and rice oil.

2. The method of combining at least two fatty triglycerides which are not mutually soluble and consequently do not fully dissolve together, one of said triglycerides having relatively high titre and relatively low iodine value, the other having relatively low titre and relatively high iodine value, said method comprising intermixng said fatty triglycerides in the presence of substantially 5 to 25 per cent rape-seed oil.

3. The method of combining at least two fatty triglycerides which are not mutually soluble and consequently do not fully dissolve together, one of said triglycerides having relatively high titre and relatively low iodine value, the other having relatively low titre and relatively high iodine value, said method comprising intermixing said fatty triglycerides in the presence of substantially 5 to 25 per cent rice oil.

4. A new composition of matter consisting of a homogeneous and compatible blend of fatty triglycerides of at least three types including substantially 5 to 25 per cent of a member of a class consisting of rape-seed oil and rice oil, a member of the class consisting of soy bean oil, cotton seed oil, olive oil, corn oil, and lard oil, and a member of the class consisting of completely hydrogenated soy bean oil, cotton seed oil, olive oil, corn oil, lard and tallow, the percentage of each of the latter two components being greater than the percentage of the rape-seed or rice oil.

5. The use of rape-seed oil to blend triglycerides which are not mutually intersoluble.

6. The use of rice oil to blend triglycerides which are not mutually intersoluble.

7. An oil adapted to be used for coating baking utensils to prevent foodstuffs of the class consisting of dough and batter from sticking thereto, said oil comprising a substantially solid triglyceride, a substantially liquid triglyceride and an agent adapted to hold said triglycerides in intersolution, said agent being a member of the class consisting of rape-seed oil and rice oil.

References Cited in the file of this patent

UNITED STATES PATENTS

| | | |
|---|---|---|
| 1,403,122 | Lawson | Jan. 10, 1922 |
| 2,614,937 | Baur et al. | Oct. 21, 1952 |

FOREIGN PATENTS

| | | |
|---|---|---|
| 428,048 | Great Britain | Apr. 30, 1935 |

OTHER REFERENCES

"Structure and Composition of Foods," by Winton, vol. 1, John Wiley and Sons, Inc., New York, pages 146, 147, 452 and 453.